Feb. 3, 1942.   F. J. MILLER   2,271,899
RELEASING DEVICE FOR FISHING LINES
Filed Feb. 10, 1941
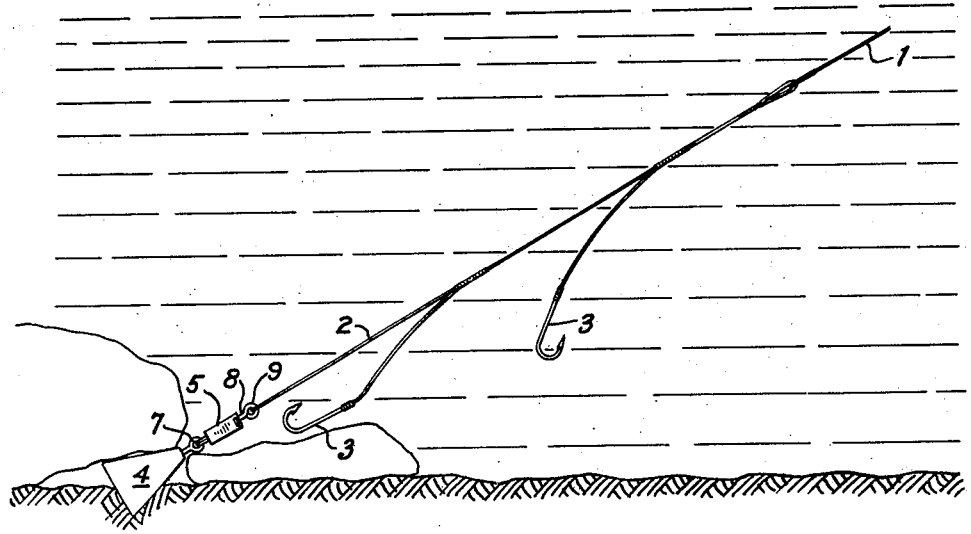
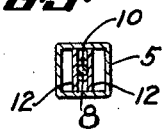
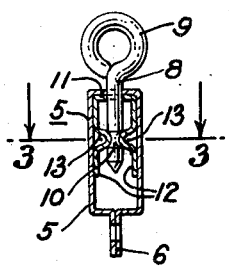
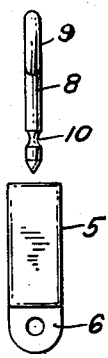
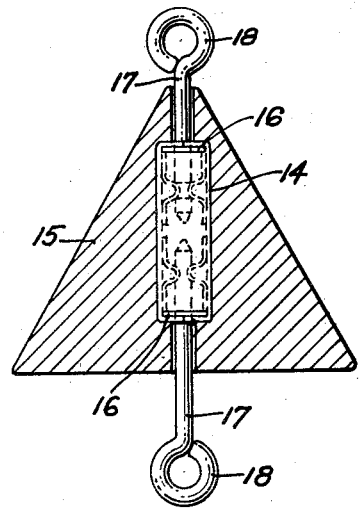
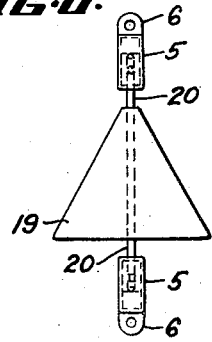
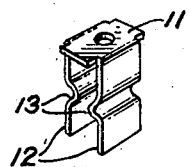
INVENTOR.
Fred J. Miller
BY J. E. Trabucco
ATTORNEY.

Patented Feb. 3, 1942

2,271,899

UNITED STATES PATENT OFFICE 2,271,899

RELEASING DEVICE FOR FISHING LINES

Fred J. Miller, San Francisco, Calif.

Application February 10, 1941, Serial No. 378,210

4 Claims. (Cl. 43—28)

This invention relates to releasing devices for fishing lines, and it has for its primary object the provision of an inexpensive releasing device which enables a fisherman to release his fishing line from a sinker when the latter becomes lodged in a crevice or is otherwise held beyond release beneath the surface of the water wherein the fishing operation is being carried on.

Another object of my invention is to provide an improved releasing device attachable between a sinker and a fishing line and which permits the recovery of the line with the hooks thereon when the sinker is caught and held in an inaccessible position beneath the surface of the water.

Another object of my invention is to provide an improved sinker having a releasing device embodied therein, which, when the sinker is unreleasably caught, enables the fisherman to detach the fishing line by exerting a sufficient pull thereon, and thereby effect the recovery of the line without the loss of any of the hooks carried thereby.

With these and other objects in view, the present invention consists of certain novel features of construction, combination and arrangement of parts to be hereinafter more particularly described.

In the accompanying drawing:

Fig. 1 shows my invention in operation;

Fig. 2 is a longitudinal sectional view of a releasing device embodying my invention;

Fig. 3 is a sectional view taken on the line 3—3 of Fig. 2;

Fig. 4 is a side elevation of the device, with the parts disconnected;

Fig. 5 is a sectional view of a modified form of my invention showing a sinker having my improved releasing device embodied therein;

Fig. 6 is a side elevation of another modified form of my invention; and

Fig. 7 is a perspective view of a part of my releasing device.

Referring to the drawing, the numeral 1 designates a fishing line having the usual leader 2 and hooks 3 fastened thereto. Interposed between an end of the leader 2 and a sinker 4 is a releasing device embodying my invention. The releasing device is so constructed that when the sinker 4 becomes lodged in a crevice or is otherwise held beyond release beneath the surface of the water wherein the fishing operation is being conducted, a fisherman may, upon exerting a suitable pull on the line, cause the disengagement of certain parts of the releasing device and thereby recover the leader, the hooks and the line. As shown in Figs. 1, 2, 3, 4 and 7, my improved releasing device comprises an elongated casing 5 which is preferably rectangular or square in cross-section. The casing is entirely closed, and at one end thereof a projecting member 6 is formed having an eyelet therein for the attachment of a hooked member 7 secured to the sinker 4. The opposite end of the casing has a suitable opening through which a rod 8 extends. The rod 8 is provided at one end with an eye 9 to which the leader 2 is normally fastened. The opposite end of the rod 8 is pointed, and an annular notch or groove 10 is formed therein near its pointed end. Located inside the casing is a rod engaging U-shaped member 11 made preferably from flexible metal such as copper, brass or rust-proof steel, having an opening in its central part and substantially parallel legs 12 which are formed with inwardly protruding parts 13 that are adapted to enter the groove 10 of the rod 8 and thereby normally prevent the said rod from being detached from the casing 5. In constructing my releasing device, a sheet of copper, brass or rust-proof metal is first cut into the proper shape and then formed into a casing of the kind shown and described. The rod engaging member 11 is preferably positioned in the casing prior to the closing of both ends thereof, and the pointed end of the rod is then passed through the aligned holes in the adjacent ends of the casing and the member 11, after which it is pressed inwardly until its groove 10 receives the inwardly protruding parts of the legs 12. The various parts of the releasing device may be assembled in other ways if so desired. The rod engaging member 11 is preferably made so as to permit the release of the rod 8 only when a predetermined pull is exerted on the line 1. In ordinary practice the legs 12 of the rod engaging member 11 will not give way to permit the release of the grooved rod 8 until there is exerted a predetermined outward pull upon the latter. The particular number of pounds pull required to effect the release of the rod 8 from the engaging legs 12 of the member 11, is preferably such that a release of the line from the sinker will not be effected during the normal fishing operation, but only when the sinker becomes lodged in a crevice or is caught in some other way. In the event the sinker becomes lodged in some inaccessible structure while fishing, the line, leader and hooks may be detached therefrom by merely exerting a suitable pull upon the line. The sinker and a part of the releasing device is lost when the rod 8 becomes released from the legs 12 of the member 11, but the leader, hooks and line, which represent a substantial part of the fishing tackle, are salvaged.

In Fig. 5 a casing 14 is shown as being imbedded as by casting, inside the sinker 4. In this particular embodiment of my invention, there are provided two rod engaging members 16 of the kind described, inside the casing 14, and there are also provided two rods 17, one extending through an oversized opening in the sinker leading to one end of the casing, and the other extending through another oversized opening in the sinker leading to the opposite end of the casing. The free ends of the rods 8 are provided with suitable eyelets 18.

In Fig. 6 a sinker 19 has a rod 20 secured to and extending therethrough. The opposite ends of the rod are each provided with pointed ends and grooves, as in the rods 8, and engaging with the said ends of the rod are flexible members of the kind described. The flexible members are housed in casings 5 which are provided with members 6 for attaching lines or leaders.

Having described my invention, what I claim is:

1. A releasing device for allowing the detachment of a fishing line from a sinker when the latter becomes caught, said device comprising a casing having means at one end for securing it to a sinker, a rod extending into the casing through the latter's opposite end, and means normally carried by the casing for engaging with and normally holding the rod, the said means being adapted to release the rod when a predetermined pull is exerted on the line.

2. A releasing device for allowing the detachment of a fishing line from a sinker when the latter becomes caught, said device comprising a casing having means at one end for securing it to a sinker, a metal rod normally fastened to a fishing line and extending into the casing through the latter's opposite end, and means carried in the casing for releasably grasping the rod and normally holding it so the line and sinker are connected, the said means being so constructed and arranged as to release the rod when a predetermined pull is exerted on the rod, whereby the line may be detached from the sinker when the latter is caught.

3. A releasing device for allowing the detachment of a fishing line from a sinker when the latter becomes caught, said device comprising a casing having means at one end for securing it to a sinker, a metal member fastened to a fishing line and having its opposite end extending into the casing through the latter's opposite end, the end of the member which extends into the casing having a groove therein, and a U-shaped member carried in the casing having legs which releasably engage with the grooved end of the metal member, the said U-shaped member being so constructed and arranged as to normally hold the rod so the line and sinker are connected, but which, when a predetermined pull is exerted on the line, will permit the release of the metal member to allow the line to be disconnected from the sinker.

4. In fishing tackle, means for releasably connecting a fishing line and a sinker comprising a casing connectable at one end to either the line or the sinker, a detachable member connectable to either the line or the sinker having one end extending into the casing, and means carried by the casing for detachably engaging with the member, the said means being releasable from the member when a predetermined pull is exerted on the member.

FRED J. MILLER.